United States Patent
Lee et al.

(10) Patent No.: US 9,752,657 B2
(45) Date of Patent: Sep. 5, 2017

(54) PLANETARY GEAR TRAIN OF AUTOMATIC TRANSMISSION FOR VEHICLE

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 14/925,865

(22) Filed: Oct. 28, 2015

(65) Prior Publication Data

US 2016/0327131 A1    Nov. 10, 2016

(30) Foreign Application Priority Data

May 6, 2015  (KR) ........................ 10-2015-0063357

(51) Int. Cl.
  *F16H 3/66*  (2006.01)
(52) U.S. Cl.
  CPC ....... *F16H 3/66* (2013.01); *F16H 2200/0069* (2013.01); *F16H 2200/2012* (2013.01); *F16H 2200/2048* (2013.01)
(58) Field of Classification Search
  CPC ...... F16H 3/62; F16H 3/66; F16H 2200/2012; F16H 2200/2048
  See application file for complete search history.

(56) References Cited

U.S. PATENT DOCUMENTS

| 2010/0240488 A1* | 9/2010 | Carey | F16H 3/66 475/276 |
| 2012/0270694 A1* | 10/2012 | Seo | F16H 3/66 475/276 |
| 2012/0302393 A1* | 11/2012 | Seo | F16H 3/663 475/276 |

FOREIGN PATENT DOCUMENTS

| KR | 10-2009-0097635 A | 9/2009 |
| KR | 10-2013-0031456 A | 3/2013 |
| KR | 10-2014-0046240 A | 4/2014 |
| KR | 10-1448789 B1 | 10/2014 |

* cited by examiner

*Primary Examiner* — Jacob S Scott
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and seven friction elements disposed between at least one rotation element among the twelve rotation elements and another rotation element or the input shaft, or between at least one rotation element among the twelve rotation elements and a transmission housing.

11 Claims, 2 Drawing Sheets

FIG. 2

| | B1 | B2 | B3 | C1 | C2 | C3 | C4 | Gear ratio | Step ratio | Span of gear ratios |
|---|---|---|---|---|---|---|---|---|---|---|
| 1ST | | ● | ● | | | ● | | 5.532 | 1.675 | 9.95 |
| 2ND | | | ● | | ● | ● | | 3.302 | 1.474 | |
| 3RD | | ● | ● | ● | ● | | | 2.240 | 1.385 | |
| 4TH | | | ● | ● | ● | | | 1.617 | 1.336 | |
| 5TH | | ● | | ● | ● | | | 1.210 | 1.210 | |
| 6TH | | | | ● | ● | ● | | 1.000 | 1.148 | |
| 7TH | | ● | | ● | | ● | | 0.871 | 1.190 | |
| 8TH | ● | ● | | ● | | ● | | 0.732 | 1.188 | |
| 9TH | ● | ● | | ● | | | | 0.616 | 1.108 | |
| 10TH | ● | | | ● | | | ● | 0.556 | | |
| REV | ● | ● | ● | | | | | -4.705 | | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0063357 filed May 6, 2015, the entire contents of which is incorporated herein for all purposes by this reference.

BACKGROUND OF THE INVENTION

Field of the Invention

The present invention relates to a planetary gear train of an automatic transmission for a vehicle. More particularly, the present invention relates to a planetary gear train of an automatic transmission for a vehicle which improves power delivery performance and fuel efficiency as a consequence of achieving ten forward speed stages using a minimum number of constituent elements, enlarging a span of gear ratios, and linearly increasing or decreasing step ratios between speed stages.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8-speed automatic transmission tends to be implemented and the research and development of a planetary gear train capable of implementing more speed stages has also been actively conducted.

Since a span of gear ratios of the recent 8-speed automatic transmission is merely 6.5 to 7.5, the 8-speed automatic transmission has no great effect of improving fuel efficiency.

In addition, since step ratios between speed stages may not be increased or decreased linearly in a case in which a span of gear ratios of the 8-speed automatic transmission is greater than or equal to 9.0, driving efficiency of an engine and drivability of a vehicle may be deteriorated. Accordingly, there is a need for development of a high efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving ten forward speed stages and one reverse speed stage using a minimum number of constituent elements, by enlarging a span of gear ratios, and by linearly increasing or decreasing step ratios between speed stages.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and seven friction elements disposed between at least one rotation element among the twelve rotation elements and another rotation element or the input shaft, or between at least one rotation element among the twelve rotation elements and a transmission housing, in which the input shaft may be continuously connected to the fourth rotation element and may be selectively connected to the eighth rotation element, the output shaft may be continuously connected to the eleventh rotation element, the eleventh rotation element may be continuously connected to the ninth rotation element, the twelfth rotation element may be continuously connected to the eighth rotation element, the seventh rotation element may be continuously connected to the third rotation element, the sixth rotation element may be continuously connected to the second rotation element, and three friction elements among the seven friction elements may be operated at each speed stage.

The fifth rotation element may be selectively connected to the transmission housing, the first rotation element may be selectively connected to the transmission housing, the tenth rotation element may be selectively connected to the transmission housing, the fourth rotation element may be selectively connected to the fifth rotation element, the third rotation element may be selectively connected to the fifth rotation element, and the first rotation element may be selectively connected to the twelfth rotation element.

A sun gear, a planet carrier, and a ring gear of the first planetary gear set may be set as the first, second, and third rotation elements, a sun gear, a planet carrier, and a ring gear of the second planetary gear set may be set as the fourth, fifth, and sixth rotation elements, a sun gear, a planet carrier, and a ring gear of the third planetary gear set may be set as the seventh, eighth, and ninth rotation elements, and a sun gear, a planet carrier, and a ring gear of the fourth planetary gear set may be set as the tenth, eleventh, and twelfth rotation elements.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first rotation shaft including the first rotation element and selectively connected to a transmission housing, a second rotation shaft including the second and sixth rotation elements, a third rotation shaft including the third and seventh rotation elements, a fourth rotation shaft including the fourth rotation element and directly connected to the input shaft, a fifth rotation shaft including the fifth rotation element, selectively connected to the transmission housing, and selectively connected to the third rotation shaft or the fourth rotation shaft, a sixth rotation shaft including the eighth and twelfth rotation elements and selectively connected to the first rotation shaft or the fourth rotation shaft, a seventh rotation shaft including the ninth and eleventh rotation elements and directly connected to the output shaft, and an eighth rotation shaft including the tenth rotation element and selectively connected to the transmission housing.

The first planetary gear set may be a single pinion planetary gear set and include a first sun gear that is the first rotation element, a first planet carrier that is the second rotation element, and a first ring gear that is the third rotation element, the second planetary gear set may be a single pinion planetary gear set and include a second sun gear that is the fourth rotation element, a second planet carrier that is the fifth rotation element, and a second ring gear that is the sixth rotation element, the third planetary gear set may be a single pinion planetary gear set and include a third sun gear that is the seventh rotation element, a third planet carrier that is the eighth rotation element, and a third ring gear that is the ninth rotation element, and the fourth planetary gear set may be a single pinion planetary gear set and include a fourth sun gear that is the tenth rotation element, a fourth planet carrier that is the eleventh rotation element, and a fourth ring gear that is the twelfth rotation element.

The planetary gear train may further include a first clutch disposed between the fourth rotation shaft and the sixth rotation shaft, a second clutch disposed between the fourth rotation shaft and the fifth rotation shaft, a third clutch disposed between the third rotation shaft and the fifth rotation shaft, a fourth clutch disposed between the first rotation shaft and the sixth rotation shaft, a first brake disposed between the fifth rotation shaft and the transmission housing, a second brake disposed between the first rotation shaft and the transmission housing, and a third brake disposed between the eighth rotation shaft and the transmission housing.

A first forward speed stage may be achieved by operation of the third clutch and the second and third brakes, a second forward speed stage may be achieved by operation of the second and third clutches and the third brake, a third forward speed stage may be achieved by operation of the second clutch and the second and third brakes, a fourth forward speed stage may be achieved by operation of the first and second clutches and the third brake, a fifth forward speed stage may be achieved by operation of the first and second clutches and the second brake, a sixth forward speed stage may be achieved by operation of the first, second, and third clutches, a seventh forward speed stage may be achieved by operation of the first and third clutches and the second brake, an eighth forward speed stage may be achieved by operation of the first and third clutches and the first brake, a ninth forward speed stage may be achieved by operation of the first clutch and the first and second brakes, a tenth forward speed stage may be achieved by operation of the first and fourth clutches and the first brake, and a reverse speed stage may be achieved by operation of the first, second, and third brakes.

According to various aspects of the present invention, a planetary gear train of an automatic transmission for a vehicle may include an input shaft receiving torque of an engine, an output shaft outputting changed torque, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, and a fourth planetary gear set including a fourth sun gear, a fourth planet carrier, and a fourth ring gear, in which the input shaft may be directly connected to the second sun gear, the output shaft may be directly connected to the third ring gear and the fourth planet carrier, the first planet carrier may be directly connected to the second ring gear, the first ring gear may be directly connected to the third sun gear, the third planet carrier may be directly connected to the fourth ring gear, the second sun gear may be selectively connected to the third planet carrier, the second planet carrier may be selectively connected to the second sun gear, the second planet carrier may be selectively connected to the first ring gear and the third sun gear, the first sun gear may be selectively connected to the third planet carrier and the fourth ring gear, the second planet carrier may be selectively connected to a transmission housing, the first sun gear may be selectively connected to the transmission housing, and the fourth sun gear may be selectively connected to the transmission housing.

Each of the first, second, third, and fourth planetary gear sets may be a single pinion planetary gear set.

The planetary gear train may further include a first clutch selectively connecting the second sun gear to the third planet carrier, a second clutch selectively connecting the second planet carrier to the second sun gear, a third clutch selectively connecting the second planet carrier to the first ring gear and the third sun gear, a fourth clutch selectively connecting the first sun gear to the third planet carrier and the fourth ring gear, a first brake selectively connecting the second planet carrier to the transmission housing, a second brake selectively connecting the first sun gear to the transmission housing, and a third brake selectively connecting the fourth sun gear to the transmission housing.

Various embodiments of the present invention may achieve ten forward speed stages and one reverse speed stage by combining four planetary gear sets that are simple planetary gear sets with seven friction elements.

In addition, engine driving efficiency may be maximized by achieving a span of gear ratios to be greater than or equal to 9.0.

In addition, drivability such as acceleration before and after the shift and rhythm of engine speed may be improved by linearly increasing or decreasing step ratios between speed stages.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the exemplary planetary gear train according to the present invention.

Figure 1:
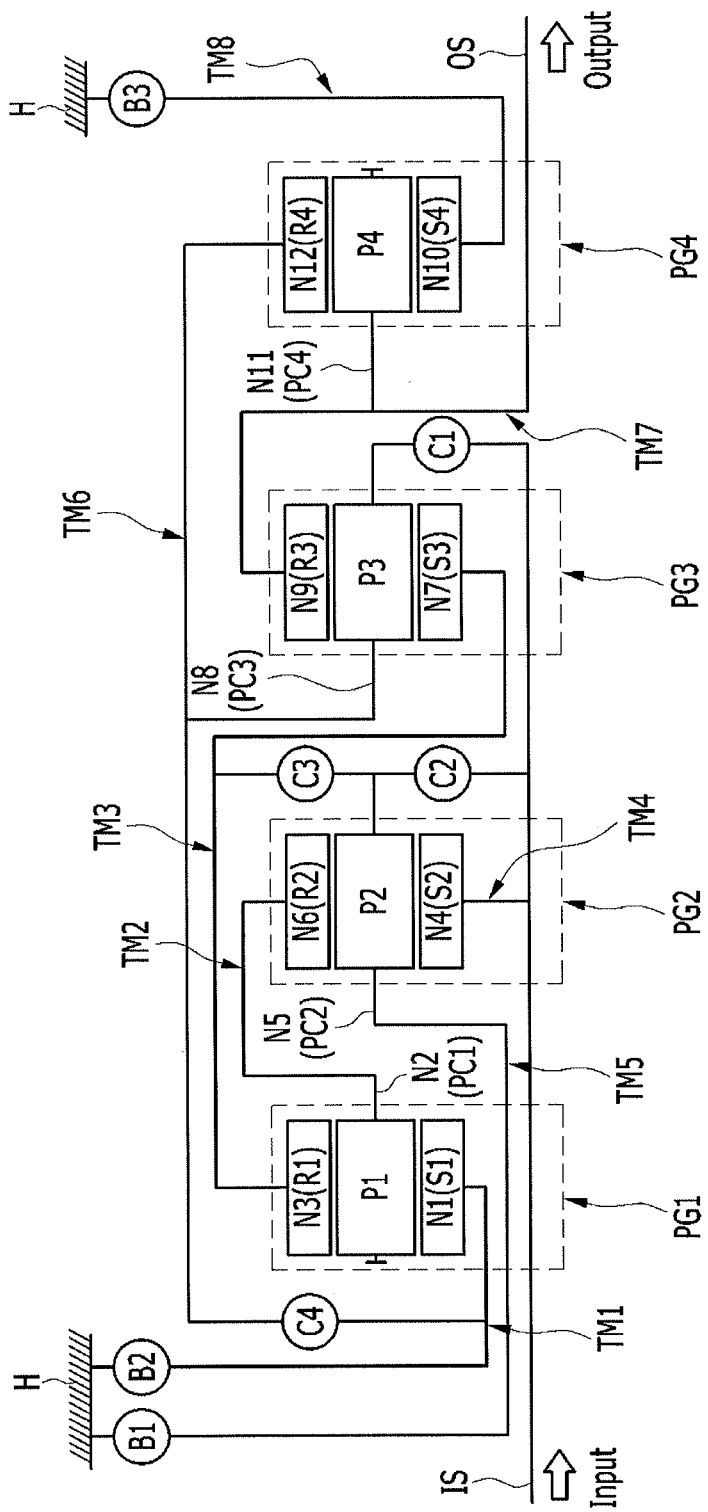
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, fourth planetary gear sets PG1, PG2, PG3, and PG4 disposed on the same axis, an input shaft IS, an output shaft OS, eight rotations shafts TM1 to TM8 including at least one rotation element of the first, second, third, and fourth planetary gear sets PG1, PG2, PG3, and PG4, seven friction elements C1 to C4 and B1 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a first pinion P1 externally engaged the first sun gear S1, and a first ring gear R1 of a third rotation element N3 internally engaged with the first pinion P1.

The second planetary gear set PG2 is a single pinion planetary gear set and includes a second sun gear S2 of a fourth rotation element N4, a second planet carrier PC2 of a fifth rotation element N5 rotatably supporting a second pinion P2 externally engaged the second sun gear S2, and a second ring gear of a sixth rotation element N6 internally engaged with the second pinion P2.

The third planetary gear set PG3 is a single pinion planetary gear set and includes a third sun gear S3 of a seventh rotation element N7, a third planet carrier PC3 of an eighth rotation element N8 rotatably supporting a third pinion P3 externally engaged with the third sun gear S3, and a third ring gear R3 of a ninth rotation element N9 internally engaged with the third pinion P3.

The fourth planetary gear set PG4 is a single pinion planetary gear set and includes a fourth sun gear S4 of a tenth rotation element N10, a fourth planet carrier PC4 of an eleventh rotation element N11 rotatably supporting a fourth pinion P4 externally engaged with the fourth sungear S4, and a fourth ring gear R4 of a twelfth rotation element N12 internally engaged with the fourth pinion P4.

The second rotation element N2 is directly connected to the sixth rotation element N6, the third rotation element N3 is directly connected to the seventh rotation element N7, the eighth rotation element N8 is directly connected to the twelfth rotation element N12, the ninth rotation element N9 is directly connected to the eleventh rotation element N11, and the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 includes the first rotation element N1, and is selectively connected to the transmission housing H.

The second rotation shaft TM2 includes the second rotation element N2 and the sixth rotation element N6.

The third rotation shaft TM3 includes the third rotation element N3 and the seventh rotation element N7.

The fourth rotation shaft TM4 includes the fourth rotation element N4, and is directly connected to the input shaft IS so as to be continuously operated as an input element.

The fifth rotation shaft TM5 includes the fifth rotation element N5, is selectively connected to the transmission housing H, and is selectively connected to the third rotation shaft TM3 or the fourth rotation shaft TM4.

The sixth rotation shaft TM6 includes the eighth rotation element N8 and the twelfth rotation element N12, and is selectively connected to the first rotation shaft TM1 or the fourth rotation shaft TM4.

The seventh rotation shaft TM7 includes the ninth rotation element N9 and the eleventh rotation element N11, and is directly connected to the output shaft OS so as to be continuously operated as an output element.

The eighth rotation shaft TM8 includes the tenth rotation element N10, and is selectively connected to the transmission housing H.

In addition, four clutches C1, C2, C3, and C4 which are friction elements are disposed at connection portions between any two rotation shafts.

In addition, three brakes B1, B2, and B3 which are friction elements are disposed at connection portions between any one rotation shaft and the transmission housing H.

The seven friction elements C1 to C4 and B1 to B3 will be described in further detail.

The first clutch C1 is disposed between the fourth rotation shaft TM4 and the sixth rotation shaft TM6 and selectively connects the fourth rotation shaft TM4 to the sixth rotation shaft TM6.

The second clutch C2 is disposed between the fourth rotation shaft TM4 and the fifth rotation shaft TM5 and selectively connects the fourth rotation shaft TM4 to the fifth rotation shaft TM5.

The third clutch C3 is disposed between the third rotation shaft TM3 and the fifth rotation shaft TM5 and selectively connects the third rotation shaft TM3 to the fifth rotation shaft TM5.

The fourth clutch C4 is disposed between the first rotation shaft TM1 and the sixth rotation shaft TM6 and selectively connects the first rotation shaft TM1 to the sixth rotation shaft TM6.

The first brake B1 is disposed between the fifth rotation shaft TM5 and the transmission housing H and causes the fifth rotation shaft TM5 to be operated as a selective fixed element.

The second brake B2 is disposed between the first rotation shaft TM1 and the transmission housing H and causes the first rotation shaft TM1 to be operated as a selective fixed element.

The third brake B3 is disposed between the eighth rotation shaft TM8 and the transmission housing H and causes the eighth rotation shaft TM8 to be operated as a selective fixed element.

The friction elements including the first, second, third, and fourth clutches C1, C2, C3, and C4 and the first, second, and third brakes B1, B2, and B3 may be multi-plates friction elements of wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention. Shifting processes in the various embodiments of the present invention will be described in further detail.

If the third clutch C3 and the second and third brakes B2 and B3 are operated at a first forward speed stage 1ST, the third rotation shaft TM3 is connected to the fifth rotation shaft TM5, rotation speed of the input shaft IS is input to the fourth rotation shaft TM4, and the first and eighth rotation shafts TM1 and TM8 are operated as the fixed elements. Therefore, the first forward speed stage is achieved.

If the second and third clutches C2 and C3 and the third brake B3 are operated at a second forward speed stage 2ND, the fourth rotation shaft TM4 is connected to the fifth rotation shaft TM5, the third rotation shaft TM3 is connected to the fifth rotation shaft TM5, rotation speed of the input shaft IS is input to the fourth rotation shaft TM4, and the eighth rotation shaft TM8 is operated as the fixed element. Therefore, the second forward speed stage is achieved.

If the second clutch C2 and the second and third brakes B2 and B3 are operated at a third forward speed stage, the fourth rotation shaft TM4 is connected to the fifth rotation shaft TM5, rotation speed of the input shaft IS is input to the fourth rotation shaft TM4, and the first and eighth rotation shafts TM1 and TM8 are operated as the fixed elements. Therefore, the third forward speed stage is achieved.

If the first and second clutches C1 and C2 and the third brake B3 are operated at a fourth forward speed stage 4TH, the fourth rotation shaft TM4 is connected to the sixth rotation shaft TM6, the fourth rotation shaft TM4 is connected to the fifth rotation shaft TM5, rotation speed of the input shaft IS is input to the fourth rotation shaft TM4, and the eighth rotation shaft TM8 is operated as the fixed element. Therefore, the fourth forward speed stage is achieved.

If the first and second clutches C1 and C2 and the second brake B2 are operated at a fifth forward speed stage 5TH, the fourth rotation shaft TM4 is connected to the sixth rotation shaft TM6, the fourth rotation shaft TM4 is connected to the fifth rotation shaft TM5, rotation speed of the input shaft IS is input to the fourth rotation shaft TM4, and the first rotation shaft TM1 is operated as the fixed element. Therefore, the fifth forward speed stage is achieved.

If the first, second, and third clutches C1, C2, and C3 are operated at a sixth forward speed stage 6TH, the fourth rotation shaft TM4 is connected to the sixth rotation shaft TM6, the fourth rotation shaft TM4 is connected to the fifth rotation shaft TM5, the third rotation shaft TM3 is connected to the fifth rotation shaft TM5. Therefore, all the planetary gear sets become direct-coupling states. At this state, if rotation speed of the input shaft IS is input to the fourth rotation shaft TM4, the sixth forward speed stage is achieved. At the sixth forward speed stage, rotation speed that is the same as that of the input shaft IS is output.

If the first and third clutches C1 and C3 and the second brake B2 are operated at a seventh forward speed stage 7TH, the fourth rotation shaft TM4 is connected to the sixth rotation shaft TM6, the third rotation shaft TM3 is connected to the fifth rotation shaft TM5, rotation speed of the input shaft IS is input to the fourth rotation shaft TM4, and the first rotation shaft TM1 is operated as the fixed element. Therefore, the seventh forward speed stage is achieved.

If the first and third clutches C1 and C3 and the first brake B1 are operated at an eighth forward speed stage 8TH, the fourth rotation shaft TM4 is connected to the sixth rotation shaft TM6, the third rotation shaft TM3 is connected to the fifth rotation shaft TM5, rotation speed of the input shaft IS is input to the fourth rotation shaft TM4, and the third rotation shaft TM3 and the fifth rotation shaft TM5 are operated as the fixed elements. Therefore, the eighth forward speed stage is achieved.

If the first clutch C1 and the first and second brakes B1 and B2 are operated at a ninth forward speed stage 9TH, the fourth rotation shaft TM4 is connected to the sixth rotation shaft TM6, rotation speed of the input shaft IS is input to the fourth rotation shaft TM4, and the first and fifth rotation shafts TM1 and TM5 are operated as the fixed elements. Therefore, the ninth forward speed stage is achieved.

If the first and fourth clutches C1 and C4 and the first brake B1 are operated at a tenth forward speed stage 10TH, the fourth rotation shaft TM4 is connected to the sixth rotation shaft TM6, the first rotation shaft TM1 is connected to the sixth rotation shaft TM6, rotation speed of the input shaft IS is input to the fourth rotation shaft TM4, and the fifth rotation shaft TM5 is operated as the fixed element. Therefore, the tenth forward speed stage is achieved.

If the first, second, and third brakes B1, B2, and B3 are operated at a reverse speed stage REV, rotation speed of the input shaft IS is input to the fourth rotation shaft TM4, and the first, fifth, and eighth rotation shafts TM1, TM5, and TM8 are operated as the fixed elements. Therefore, the reverse speed stage is achieved.

The planetary gear train according to various embodiments of the present invention may achieve ten forward speed stages and one reverse speed stage by controlling four planetary gear sets PG1, PG2, PG3, and PG4 with four clutches C1, C2, C3, and C4 and three brakes B1, B2, and B3.

In addition, step ratios between speed stages are 1.2 or more except for between the sixth and seventh forward speed stages, between the seventh and eighth forward speed stages, and between the ninth and tenth forward speed stages, and drivability such as acceleration before and after the shift and rhythm of engine speed may be improved by linearly increasing or decreasing step ratios between speed stages.

In addition, engine driving efficiency may be maximized by achieving a span of gear ratios to be greater than or equal to 9.0.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting changed torque of the engine;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements; and
    seven friction elements disposed between at least one rotation element among the twelve rotation elements and another rotation element or the input shaft, or between at least one rotation element among the twelve rotation elements and a transmission housing,
    wherein the input shaft is continuously connected to the fourth rotation element and is selectively connected to the eighth rotation element,
    the output shaft is continuously connected to the eleventh rotation element,
    the eleventh rotation element is continuously connected to the ninth rotation element,
    the twelfth rotation element is continuously connected to the eighth rotation element,
    the seventh rotation element is continuously connected to the third rotation element,
    the sixth rotation element is continuously connected to the second rotation element, and
    three friction elements among the seven friction elements are operated at each speed stage.

2. The planetary gear train of claim 1, wherein the fifth rotation element is selectively connected to the transmission housing,
    the first rotation element is selectively connected to the transmission housing,
    the tenth rotation element is selectively connected to the transmission housing,
    the fourth rotation element is selectively connected to the fifth rotation element,
    the third rotation element is selectively connected to the fifth rotation element, and
    the first rotation element is selectively connected to the twelfth rotation element.

3. The planetary gear train of claim 1, wherein a sun gear, a planet carrier, and a ring gear of the first planetary gear set are set as the first, second, and third rotation elements,
    a sun gear, a planet carrier, and a ring gear of the second planetary gear set are set as the fourth, fifth, and sixth rotation elements,
    a sun gear, a planet carrier, and a ring gear of the third planetary gear set are set as the seventh, eighth, and ninth rotation elements, and
    a sun gear, a planet carrier, and a ring gear of the fourth planetary gear set are set as the tenth, eleventh, and twelfth rotation elements.

4. A planetary gear train of an automatic transmission for a vehicle, comprising:
    an input shaft receiving torque of an engine;
    an output shaft outputting changed torque of the engine;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;
    a first rotation shaft including the first rotation element and selectively connected to a transmission housing;
    a second rotation shaft including the second and sixth rotation elements;
    a third rotation shaft including the third and seventh rotation elements;
    a fourth rotation shaft including the fourth rotation element and directly connected to the input shaft;
    a fifth rotation shaft including the fifth rotation element, selectively connected to the transmission housing, and selectively connected to the third rotation shaft or the fourth rotation shaft;
    a sixth rotation shaft including the eighth and twelfth rotation elements and selectively connected to the first rotation shaft or the fourth rotation shaft;
    a seventh rotation shaft including the ninth and eleventh rotation elements and directly connected to the output shaft; and
    an eighth rotation shaft including the tenth rotation element and selectively connected to the transmission housing.

5. The planetary gear train of claim 4, wherein the first planetary gear set is a single pinion planetary gear set and includes a first sun gear that is the first rotation element, a first planet carrier that is the second rotation element, and a first ring gear that is the third rotation element,
    the second planetary gear set is a single pinion planetary gear set and includes a second sun gear that is the fourth rotation element, a second planet carrier that is the fifth rotation element, and a second ring gear that is the sixth rotation element,
    the third planetary gear set is a single pinion planetary gear set and includes a third sun gear that is the seventh rotation element, a third planet carrier that is the eighth rotation element, and a third ring gear that is the ninth rotation element, and
    the fourth planetary gear set is a single pinion planetary gear set and includes a fourth sun gear that is the tenth rotation element, a fourth planet carrier that is the eleventh rotation element, and a fourth ring gear that is the twelfth rotation element.

6. The planetary gear train of claim 4, further comprising:
a first clutch disposed between the fourth rotation shaft and the sixth rotation shaft;
a second clutch disposed between the fourth rotation shaft and the fifth rotation shaft;
a third clutch disposed between the third rotation shaft and the fifth rotation shaft;
a fourth clutch disposed between the first rotation shaft and the sixth rotation shaft;
a first brake disposed between the fifth rotation shaft and the transmission housing;
a second brake disposed between the first rotation shaft and the transmission housing; and
a third brake disposed between the eighth rotation shaft and the transmission housing.

7. The planetary gear train of claim 6, wherein a first forward speed stage is achieved by operation of the third clutch and the second and third brakes,
a second forward speed stage is achieved by operation of the second and third clutches and the third brake,
a third forward speed stage is achieved by operation of the second clutch and the second and third brakes,
a fourth forward speed stage is achieved by operation of the first and second clutches and the third brake,
a fifth forward speed stage is achieved by operation of the first and second clutches and the second brake,
a sixth forward speed stage is achieved by operation of the first, second, and third clutches,
a seventh forward speed stage is achieved by operation of the first and third clutches and the second brake,
an eighth forward speed stage is achieved by operation of the first and third clutches and the first brake,
a ninth forward speed stage is achieved by operation of the first clutch and the first and second brakes,
a tenth forward speed stage is achieved by operation of the first and fourth clutches and the first brake, and
a reverse speed stage is achieved by operation of the first, second, and third brakes.

8. A planetary gear train of an automatic transmission for a vehicle, comprising:
an input shaft receiving torque of an engine;
an output shaft outputting changed torque;
a first planetary gear set including a first sun gear, a first planet carrier, and a first ring gear;
a second planetary gear set including a second sun gear, a second planet carrier, and a second ring gear;
a third planetary gear set including a third sun gear, a third planet carrier, and a third ring gear; and
a fourth planetary gear set including a fourth sun gear, a fourth planet carrier, and a fourth ring gear,
wherein the input shaft is directly connected to the second sun gear,
the output shaft is directly connected to the third ring gear and the fourth planet carrier,
the first planet carrier is directly connected to the second ring gear,
the first ring gear is directly connected to the third sun gear,
the third planet carrier is directly connected to the fourth ring gear,
the second sun gear is selectively connected to the third planet carrier,
the second planet carrier is selectively connected to the second sun gear,
the second planet carrier is selectively connected to the first ring gear and the third sun gear,
the first sun gear is selectively connected to the third planet carrier and the fourth ring gear,
the second planet carrier is selectively connected to a transmission housing,
the first sun gear is selectively connected to the transmission housing, and
the fourth sun gear is selectively connected to the transmission housing.

9. The planetary gear train of claim 8, wherein each of the first, second, third, and fourth planetary gear sets is a single pinion planetary gear set.

10. The planetary gear train of claim 8, further comprising:
a first clutch selectively connecting the second sun gear to the third planet carrier;
a second clutch selectively connecting the second planet carrier to the second sun gear;
a third clutch selectively connecting the second planet carrier to the first ring gear and the third sun gear;
a fourth clutch selectively connecting the first sun gear to the third planet carrier and the fourth ring gear;
a first brake selectively connecting the second planet carrier to the transmission housing;
a second brake selectively connecting the first sun gear to the transmission housing; and
a third brake selectively connecting the fourth sun gear to the transmission housing.

11. The planetary gear train of claim 10, wherein a first forward speed stage is achieved by operation of the third clutch and the second and third brakes,
a second forward speed stage is achieved by operation of the second and third clutches and the third brake,
a third forward speed stage is achieved by operation of the second clutch and the second and third brakes,
a fourth forward speed stage is achieved by operation of the first and second clutches and the third brake,
a fifth forward speed stage is achieved by operation of the first and second clutches and the second brake,
a sixth forward speed stage is achieved by operation of the first, second, and third clutches,
a seventh forward speed stage is achieved by operation of the first and third clutches and the second brake,
an eighth forward speed stage is achieved by operation of the first and third clutches and the first brake,
a ninth forward speed stage is achieved by operation of the first clutch and the first and second brakes,
a tenth forward speed stage is achieved by operation of the first and fourth clutches and the first brake, and
a reverse speed stage is achieved by operation of the first, second, and third brakes.

* * * * *